United States Patent
Kim

(10) Patent No.: US 9,918,029 B2
(45) Date of Patent: Mar. 13, 2018

(54) IMAGING SYSTEMS WITH SWITCHABLE COLUMN POWER CONTROL

(71) Applicant: Semiconductor Components Industries, LLC, Phoenix, AZ (US)

(72) Inventor: Dongsoo Kim, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 911 days.

(21) Appl. No.: 13/926,657

(22) Filed: Jun. 25, 2013

(65) Prior Publication Data

US 2014/0263957 A1 Sep. 18, 2014

Related U.S. Application Data

(60) Provisional application No. 61/785,719, filed on Mar. 14, 2013.

(51) Int. Cl.
*H04N 5/369* (2011.01)

(52) U.S. Cl.
CPC ............................... *H04N 5/3698* (2013.01)

(58) Field of Classification Search
CPC ....... H04N 5/3698; H04N 5/369; H04N 5/345
USPC ........ 250/208.1, 214 R, 214.1; 348/294–308
See application file for complete search history.

(56) References Cited

U.S. PATENT DOCUMENTS

| | | | |
|---|---|---|---|
| 7,723,661 B2 | 5/2010 | Hara et al. | |
| 7,728,893 B2 | 6/2010 | Kagawa et al. | |
| 8,031,247 B2 | 10/2011 | Borg | |
| 2005/0083420 A1* | 4/2005 | Koseki | H04N 5/378 348/294 |
| 2006/0261255 A1* | 11/2006 | Raynor | H01L 27/14603 250/214 R |
| 2007/0146514 A1 | 6/2007 | Maeda et al. | |
| 2009/0166513 A1 | 7/2009 | Abe et al. | |
| 2010/0149392 A1 | 6/2010 | Hara | |
| 2010/0188540 A1* | 7/2010 | Bechtel | H04N 5/378 348/302 |
| 2011/0317715 A1* | 12/2011 | Hood | G01J 5/14 370/465 |
| 2012/0154649 A1* | 6/2012 | Itzhak | H03K 21/38 348/294 |
| 2013/0134295 A1* | 5/2013 | Yan | H04N 5/345 250/208.1 |
| 2013/0181115 A1* | 7/2013 | Ono | H01L 27/14601 250/208.1 |

(Continued)

*Primary Examiner* — Kevin Pyo
*Assistant Examiner* — Don Williams
(74) *Attorney, Agent, or Firm* — Treyz Law Group, P.C.; Joseph F. Guihan

(57) ABSTRACT

Electronic devices may include image sensors having image pixel arrays with image pixels arranged in pixel rows and pixel columns. Each pixel column may be coupled to a column line having column readout circuitry and column power control circuitry that selectively enables or disables the column readout circuitry for various column lines. The column power control circuitry and the column readout circuitry may be coupled to column decoder circuitry. The column decoder circuitry may provide a column address signals to the power control and the readout circuitry. The power control circuitry may enable only column lines for which column addresses have been received.

19 Claims, 6 Drawing Sheets

(56) References Cited

U.S. PATENT DOCUMENTS

2013/0187027 A1* 7/2013 Qiao .................... H04N 5/2351
                                                        250/208.1

* cited by examiner

IMAGING SYSTEMS WITH SWITCHABLE COLUMN POWER CONTROL

This application claims the benefit of provisional patent application No. 61/785,719, filed Mar. 14, 2013, which is hereby incorporated by reference herein in its entirety.

BACKGROUND

This relates generally to imaging devices, and more particularly, to imaging devices with column circuitry.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out image signals from the image pixels. In a typical image sensor, the column readout circuitry that is coupled to all of the pixel columns in a pixel array is typically powered on.

In some situations, however, only a portion of the image pixels a pixel array may used to capture image data at any given time. For example, in some situations a sub-array of image pixels may be used to capture image data when it is desired to capture image frames having a reduced size at an increased frame rate. In a conventional image sensor, power that could otherwise be used to operate other portions of the imaging system or that could otherwise be stored and used for later imaging operations can therefore be used to unnecessarily power column readout circuits that are coupled to unused image pixels. It can be particularly useful to conserve this type of power in portable imaging systems that use batteries to provide power to the device or in power-saving modes in larger electronic devices with imaging systems.

It would therefore be desirable to be able to provide imaging devices with improved column circuitry.

DETAILED DESCRIPTION

Electronic devices such as digital cameras, computers, cellular telephones, and other electronic devices include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements. Readout circuitry may include selectable readout circuitry coupled to each column of pixels that can be enabled or disabled to reduce power consumption in the device and improve pixel readout operations.

Figure 1:
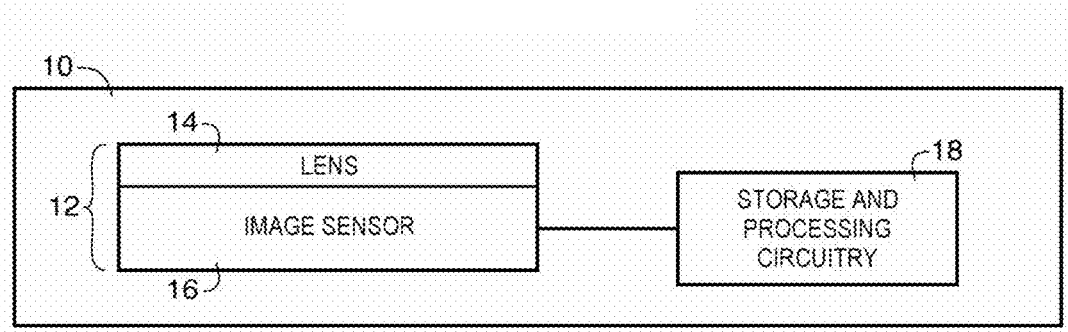
FIG. 1 is a diagram of an illustrative electronic device having an imaging system in accordance with an embodiment of the present invention.

FIG. 1 is a diagram of an illustrative electronic device that uses an image sensor to capture images. Electronic device 10 of FIG. 1 may be a portable electronic device such as a camera, a cellular telephone, a video camera, or other imaging device that captures digital image data. Camera module 12 may be used to convert incoming light into digital image data. Camera module 12 may include one or more lenses 14 and one or more corresponding image sensors 16. During image capture operations, light from a scene may be focused onto image sensor 16 by lens 14. Image sensor 16 may include circuitry for converting analog pixel data into corresponding digital image data to be provided to processing circuitry 18. If desired, camera module 12 may be provided with an array of lenses 14 and an array of corresponding image sensors 16.

Processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18. Processed image data may, if desired, be provided to external equipment (e.g., a computer or other device) using wired and/or wireless communications paths coupled to processing circuitry 18.

Figure 2:
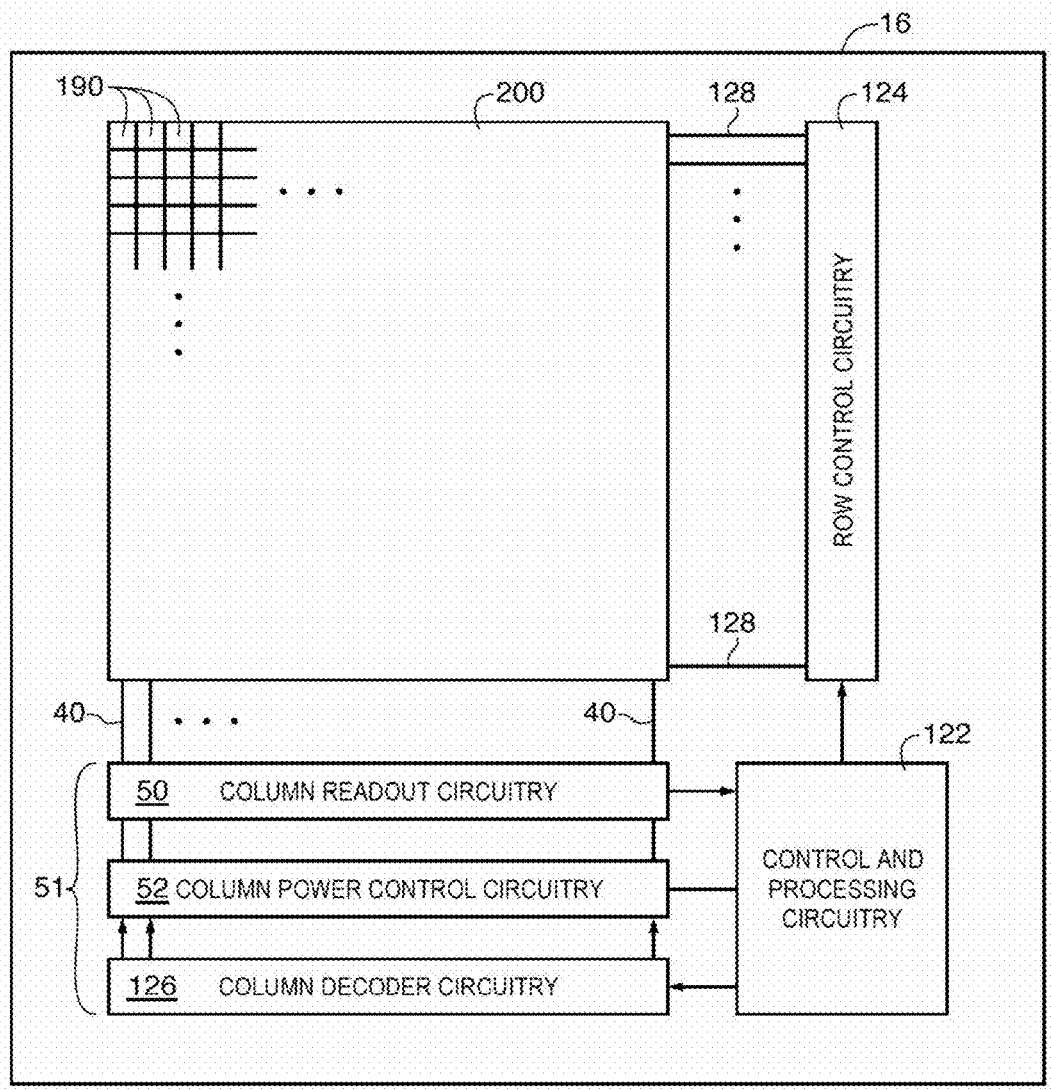
FIG. 2 is a diagram of an illustrative pixel array and associated control circuitry for powering image pixel circuitry and for reading out pixel data from image pixels along column lines in an image sensor in accordance with an embodiment of the present invention.

As shown in FIG. 2, image sensor 16 may include a pixel array 200 containing image sensor pixels 190 and control and processing circuitry 122. Array 200 may contain, for example, hundreds or thousands of rows and columns of image sensor pixels 190. Control circuitry 122 may be coupled to row control circuitry 124 and column control circuitry 51. Row control circuitry 124 may include row decoder circuitry configured to receive row addresses from control circuitry 122 and supply corresponding row control signals such as reset, row-select, transfer, and other control signals to pixels 190 over control paths 128.

Column control circuitry 51 may include column readout circuitry 50, column power control circuitry 52 and column decoder circuitry 126. One or more conductive lines such as column lines 40 may be coupled to each column of pixels 190 in array 200. Column lines 40 may be used for reading out image signals from pixels 190 and for supplying bias signals (e.g., bias currents or bias voltages) to pixels 190. During pixel readout operations, a pixel row in array 200 may be selected using row control circuitry 124 and image data associated with image pixels 190 in that pixel row can be read out along column lines 40 to column readout circuitry 50.

Column readout circuitry 50 may include sample-and-hold circuitry, amplifier circuitry, analog-to-digital conversion circuitry, bias circuitry, column memory, or other circuitry for operating pixels 190 and for reading out image signals from pixels 190. Column power control circuitry 52 may include latch circuitry for selectively turning on or turning off column readout circuitry on each of column lines 40.

Column power control circuitry 52 may be used to selectively provide power to column readout circuitry 50 on a selected subset of column lines 40. Circuitry such as latch circuits, flip-flops, and logic gates in column power control circuitry 52 may be used to dynamically turn on or turn off column readout circuitry 50 to reduce power consumption in, for example, windowing or sub-sampling modes of operation of image sensor 16. Column power control circuitry 52 may receive column addresses associated with pixel columns to be used in a particular mode of operation for sensor 16 from control circuitry 122 or from column decoder circuitry 126. Column power control circuitry may be configured to turn off column readout circuitry associated with column lines 40 that are not addressed in the received column addresses.

Readout circuitry such as signal processing circuitry associated with column circuitry 50 (e.g., sample-and-hold circuitry and analog-to-digital conversion circuitry) may be used to supply digital image data to processor 18 (FIG. 1) over path 210 for pixels in addressed and powered pixel columns.

Figure 3:
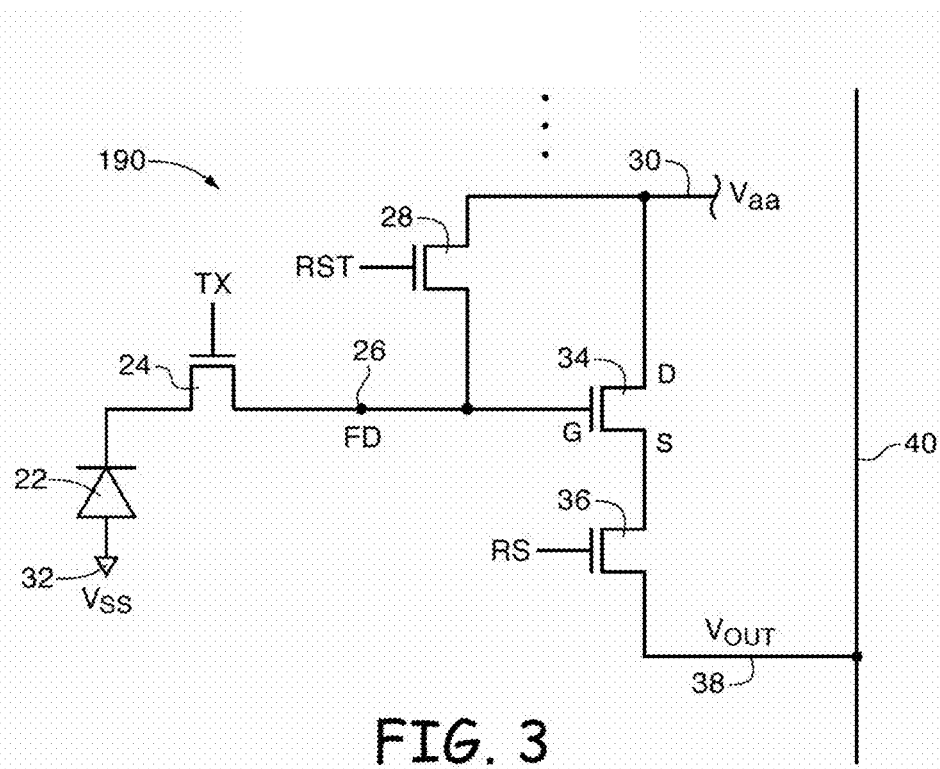
FIG. 3 is a diagram of an illustrative image sensor pixel in accordance with an embodiment of the present invention.

Circuitry in an illustrative pixel of one image sensors 16 is shown in FIG. 3. As shown in FIG. 3, pixel 190 includes a photosensitive element such as photodiode 22. A positive power supply voltage (e.g., voltage Vaa) may be supplied at positive power supply terminal 30. A ground power supply voltage (e.g., Vss) may be supplied at ground terminal 32. Incoming light may be collected by a photosensitive element such as photodiode 22 after passing through a color filter structure. Photodiode 22 converts the light to electrical charge.

Before an image is acquired, reset control signal RST may be asserted. This turns on reset transistor 28 and resets charge storage node 26 (also referred to as floating diffusion FD) to Vaa. The reset control signal RST may then be deasserted to turn off reset transistor 28. After the reset process is complete, transfer gate control signal TX may be asserted to turn on transfer transistor (transfer gate) 24. When transfer transistor 24 is turned on, the charge that has been generated by photodiode 22 in response to incoming light is transferred to charge storage node 26. Charge storage node 26 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 22. The signal associated with the stored charge on node 26 is conveyed to row select transistor 36 by source-follower transistor 34.

When it is desired to read out the value of the stored charge (i.e., the value of the stored charge that is represented by the signal at the source S of transistor 34), row select control signal RS can be asserted. When signal RS is asserted, transistor 36 turns on and a corresponding signal Vout that is representative of the magnitude of the charge on charge storage node 26 is produced on output path 38. In a typical configuration, there are numerous rows and columns of pixels such as pixel 190 in array 20. When signal RS is asserted in a given row, a path such as column line 40 can be used to route signal Vout from that pixel to readout circuitry such as column readout circuitry 50.

Figure 4:
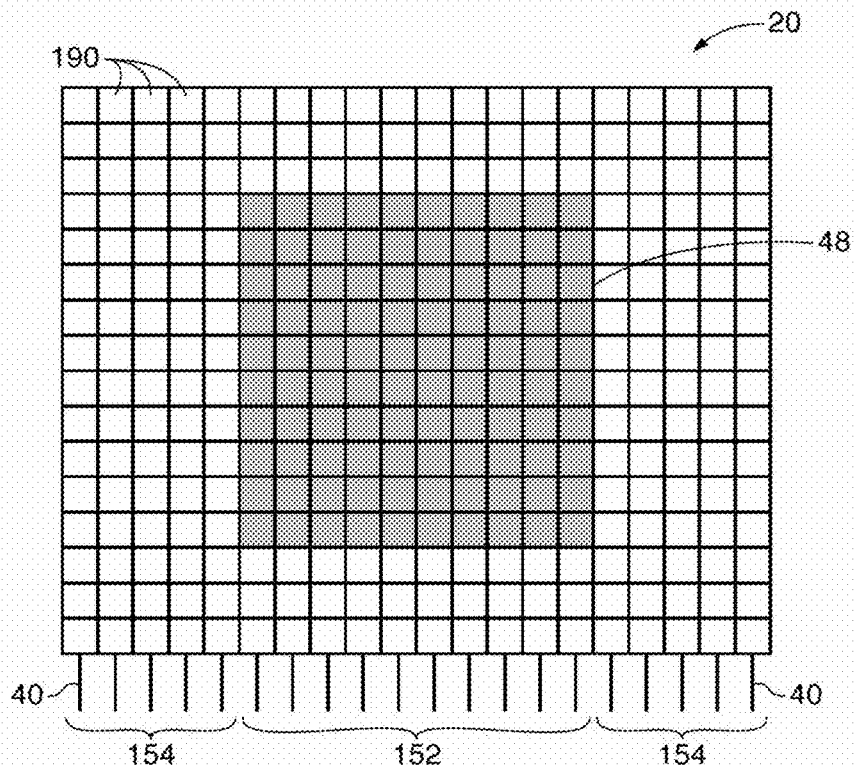
FIG. 4 is a diagram of an illustrative image sensor pixel array showing how a subset of column lines may be used for reading out pixel data from a sub-array of image sensor pixels in some modes of operation in accordance with an embodiment of the present invention.

As shown in FIG. 4, in some modes of operation, only a portion of pixel array 200 such as sub-array 48 may be used in capturing image data. Image pixels 190 in sub-array 48 may be coupled to set of active column lines 152. Image pixels 190 that are outside of sub-array 48 may be coupled to a set of inactive column lines 154. Active column lines 152 may be enabled using column power control circuitry such as circuitry 52 of FIG. 2. Inactive column lines 154 may be disabled using column power control circuitry such as circuitry 52.

Sub-array 48 of FIG. 4 is merely illustrative. If desired, active column lines 152 may be coupled to any set of chosen pixel columns. If desired active column lines 152 (e.g., column lines coupled to sub-array 48) may be located in a central portion of array 200, near an edge of portion of array 200, or in any suitable location in array 200. Sub-array 48 may include a set of contiguous pixels or may include pixels that are separated from other pixels in sub-array 48 by pixels that are coupled to some of inactive column lines 154. Sub-array 48 may include a first subset of image pixels for capturing a first image, a second, different set of image pixels for capturing a second image, etc.

Figure 5:
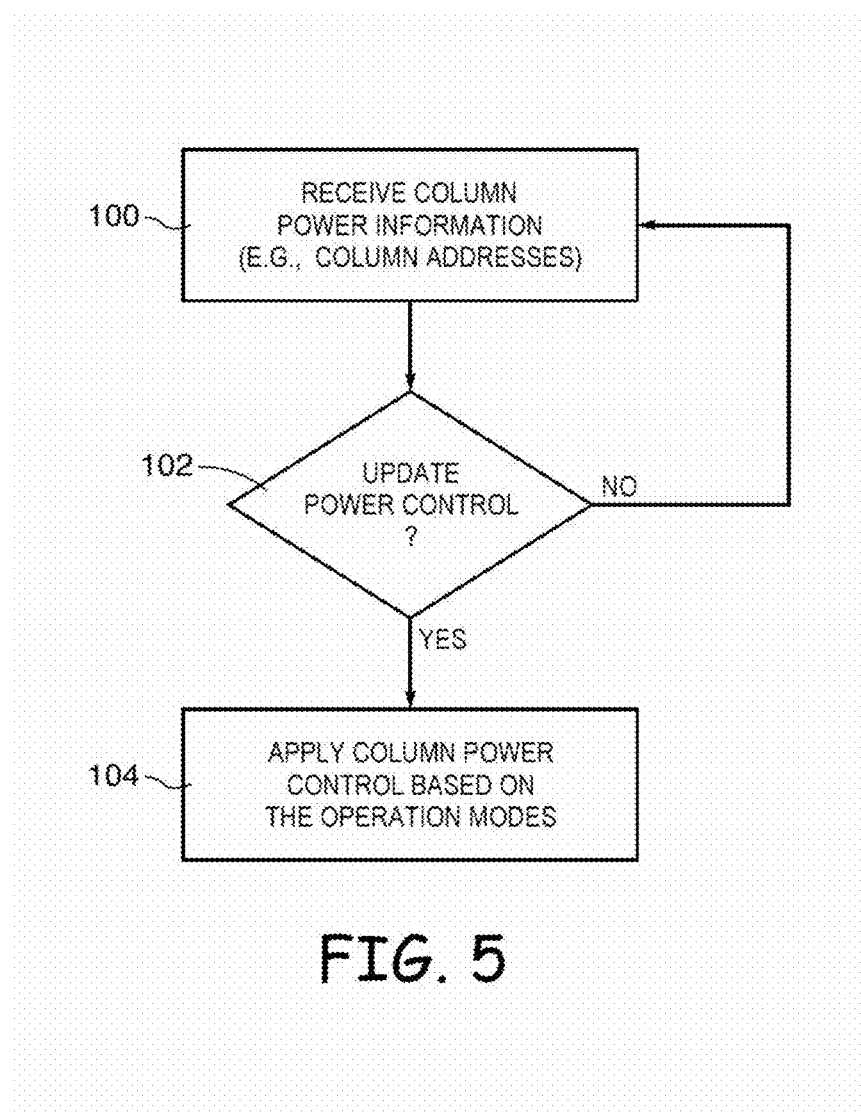
FIG. 5 is a flow chart of illustrative steps that may be used in selectively powering column readout circuitry on column lines associated with pixel columns of a pixel array in accordance with an embodiment of the present invention.

Illustrative steps that may be used in selectively powering column readout circuits on addressed column lines imaging operations are shown in FIG. 5. As shown in FIG. 5, at step 100 column power information such as column addresses of pixel columns to be read out may be received (e.g., by column power control circuitry 52 and/or column readout circuitry 50 of column control circuitry 51).

At step 102, column power control circuitry 52 may determine whether an update to column power control should be made (e.g., a gating signal that prevents or allows updating of the column power control may be received). In this way, updates to the column power control during pixel readout operations such as analog-to-digital conversion or data readout operations can be avoided.

In response to receiving an update power control signal that is asserted high, column control circuitry 51 (e.g., column power control circuitry 52) may proceed to step 104.

At step 104, column power control circuitry 52 may apply column power control based on a mode of operation of the image sensor. For example, column power control circuitry 52 may enable pixel columns in the center of pixel array 200 while disabling pixel columns near the edges of array 200, may enable a first set of alternating pixel columns (e.g., odd pixel columns) while disabling a second set of alternating pixel columns (e.g., even pixel columns) or may otherwise enable only the pixel columns associated with received pixel column addresses.

In response to receiving an update power control signal that is low, column control circuitry 51 may return to step 100.

Figure 6:
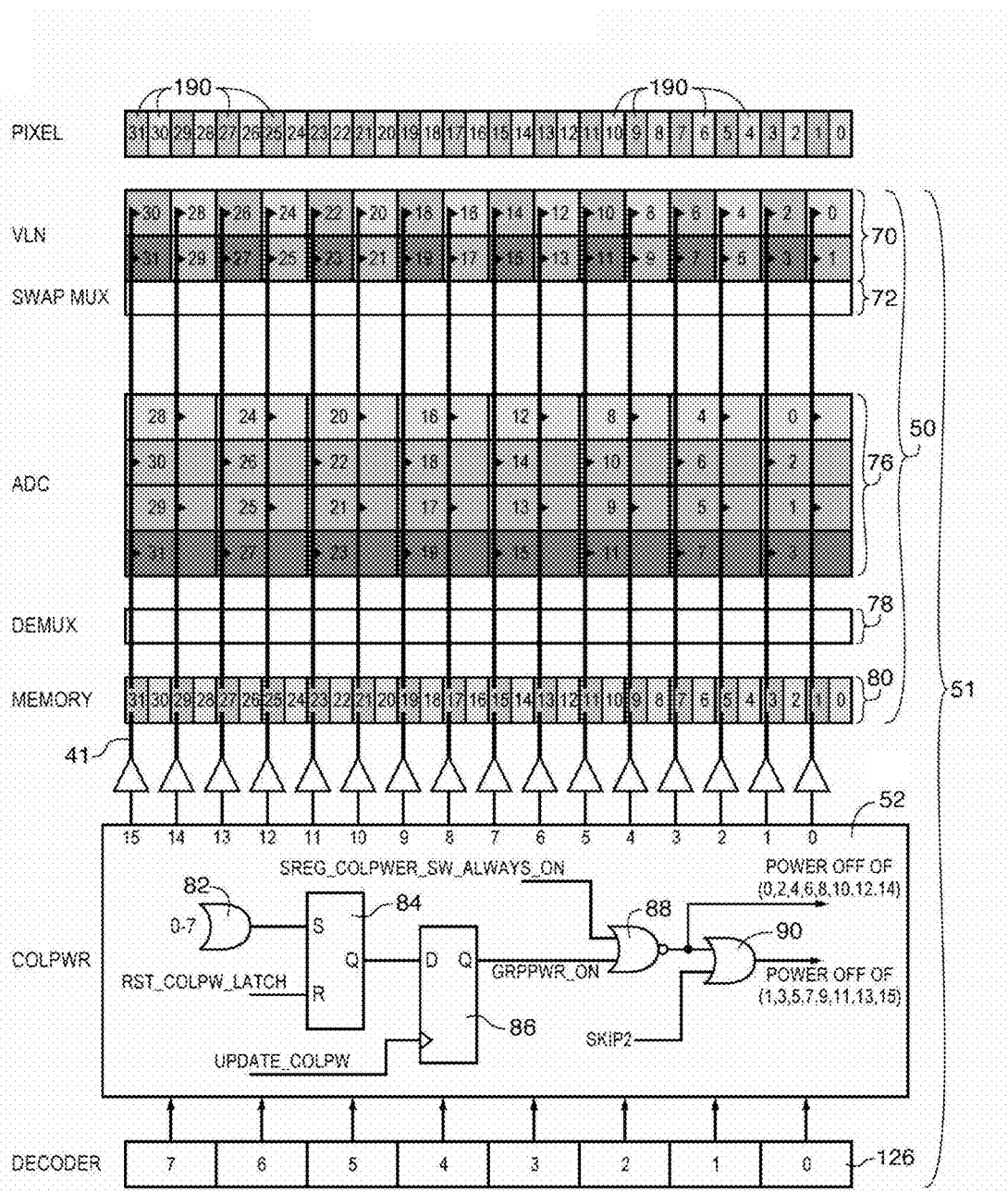
FIG. 6 is a diagram of illustrative column power control circuitry and column readout circuitry showing how column readout circuitry on all pixel columns may be powered by the column power control circuitry in accordance with an embodiment of the present invention.

FIG. 6 shows an arrangement that may be used in implementing column circuitry 51. As shown in FIG. 6, column readout circuitry 50 may include very low noise (VLN) amplifiers 70, multiplexers such as SWAP MUX 72, analog-to-digital (ADC) converters 76, demultiplexers such as DEMUX 78, memory 80, or other suitable pixel readout circuitry. Column lines 41 may be coupled between column power control circuitry 52 and column readout circuitry 50.

Column power control circuitry 52 may include logic gates such as OR gate 82. OR gate 82 may have an input that receives column addresses such as column addresses 0-7 (for example) from decoder 126 (or circuitry 122). OR gate 82 may have an output terminal that is coupled to an input set terminal of a latch such as set-reset (SR) latch 84. SR latch 84 may have an input reset terminal configured to receive a reset signal such as rst_colpw_latch for resetting column power control. Latch 84 may have an output terminal that is coupled to an input terminal of a flip-flop such as flip-flop 86. Flip-flop 86 may have an input clock terminal that receives a column power control update signal such as update_colpw. In this way, updates to the column power control may be allowed or blocked using update_colpw.

Flip-flop 86 may have an output terminal coupled to an input terminal of an NOR gate such as NOR gate 88. NOR gate 88 may have an additional input terminal that receives an always-on signal such as sreg_colpower_sw_always_on. NOR gate 88 may have an output terminal configured to power off even column readout circuits (e.g., column readout circuitry labeled 0, 2, 4, 5, 6, 10, 12, and 14) when the output signal from NOR gate 88 is a power off signal. The output terminal of NOR gate 88 may also be coupled to an input gate of an additional OR gate such as OR gate 90. OR gate 90 may have an additional input terminal configured to receive an additional power off signal such as a skip2 signal (e.g., a signal configured to cause column power control circuitry 52 to power off and power on respective alternating pairs of pixel column circuitry), or other signals for causing column power control circuitry 52 to selectively power on or power off selected column readout circuits for various modes of operation of the image sensor.

If desired, column power control circuitry of the type shown in FIG. 6 can be modified to accommodate varying column randomization circuitry to allow for selective enabling and disabling of pixel columns together with column randomization operations. If desired, column power control circuitry of this type may also allow implementation of optical columns and reference columns, thereby increasing the amount of available reference data from pixel array 200 for corrections of noise correlations or other data artifacts.

In the example of FIG. 6, column decoder 126 provides column addresses 0, 1, 2, 3, 4, 5, 6, and 7 to column power control circuitry 52. In this example, all pixels 190 (e.g., pixels 190 labeled 0-31 in the example of FIG. 6) are active pixels. However, as described above, in some modes of operation (e.g., a windowing mode, a sub-resolution mode, etc.), column power control circuitry 52 may be used to disable column readout circuitry associated with pixels to be inactive in that mode of operation. For example, column power control circuitry 52 may be used to disable columns 154 of FIG. 4 while providing power to columns 152 based on the received column addresses.

If desired, column power control circuitry 52 may additionally be used to power only a portion of the pixel columns in the active area of the array (e.g., area 48 of FIG. 4) is a sub-resolution mode (for example) for the active portion. In one suitable example, sometimes referred to herein as a horizontal skip2 mode (or simply as a skip2 mode), a skip2 signal may be provided to OR gate 90 in order to cause power control circuitry 52 to provide power to only every two columns in an alternating pattern. An example of this type of configuration is shown in FIG. 7.

Figure 7:
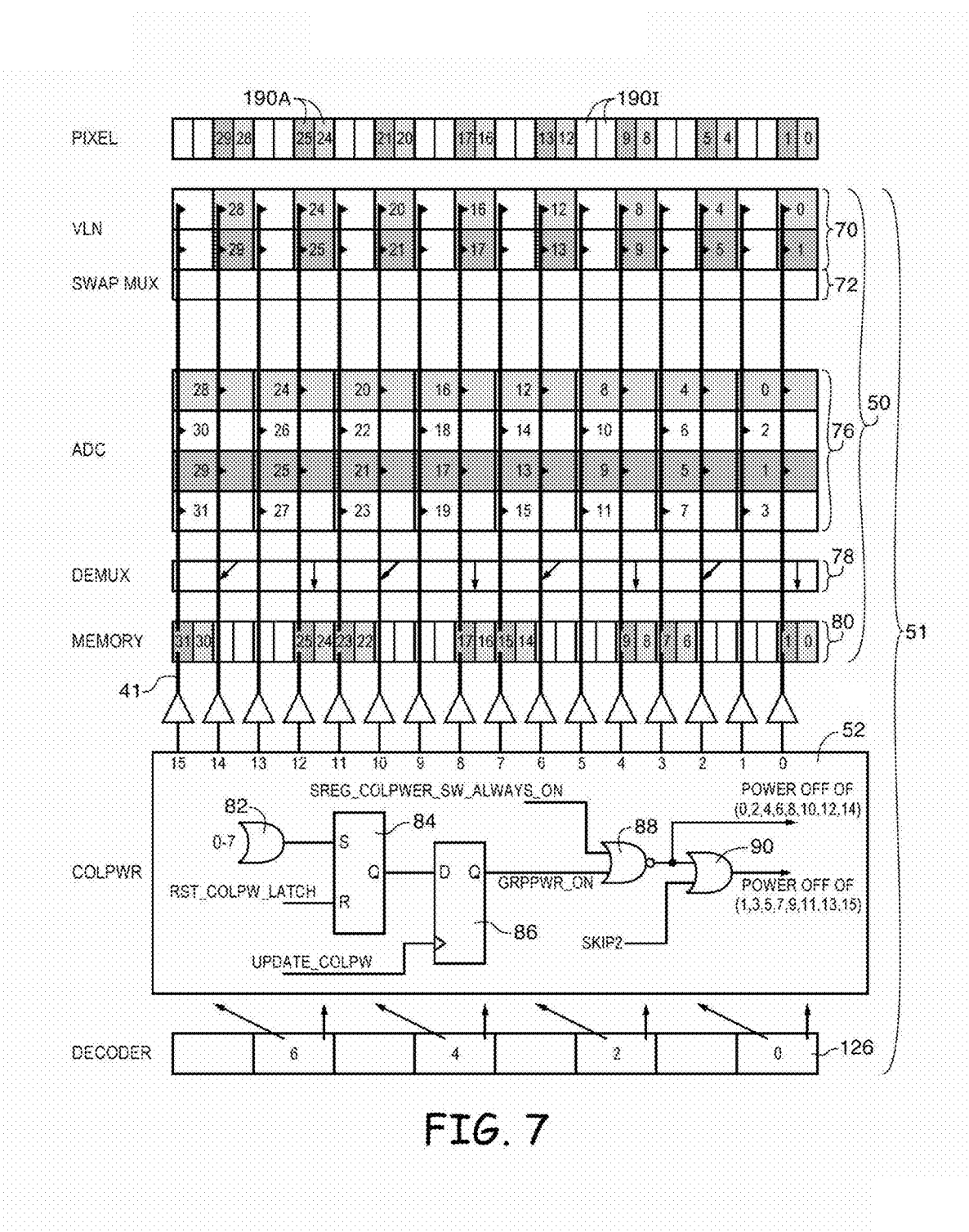
FIG. 7 is a diagram of illustrative column power control circuitry and column readout circuitry showing how column readout circuitry on selected pixel columns may be powered by the column power control circuitry in accordance with an embodiment of the present invention.

As shown in FIG. 7, when column decoder 126 does not provide column addresses for all columns (e.g., only even column addresses in the example of FIG. 7), and when the skip2 signal is asserted high, column power control circuitry 52 may be configured to turn off column readout circuitry associated with unaddressed columns. In the example of FIG. 7, shaded pixels indicate active pixels 190A, shaded column circuit elements indicate powered circuits, empty pixels indicate inactive ("off") pixels 190I, and shaded column circuit elements indicate disabled (inactive) circuits. In the example of FIG. 7, in response to receiving column addresses 0, 2, 4, and 6, column readout circuitry on column lines 41 labeled 1, 3, 5, 7, 9, 11, 13, and 15 are powered off.

Figure 8:
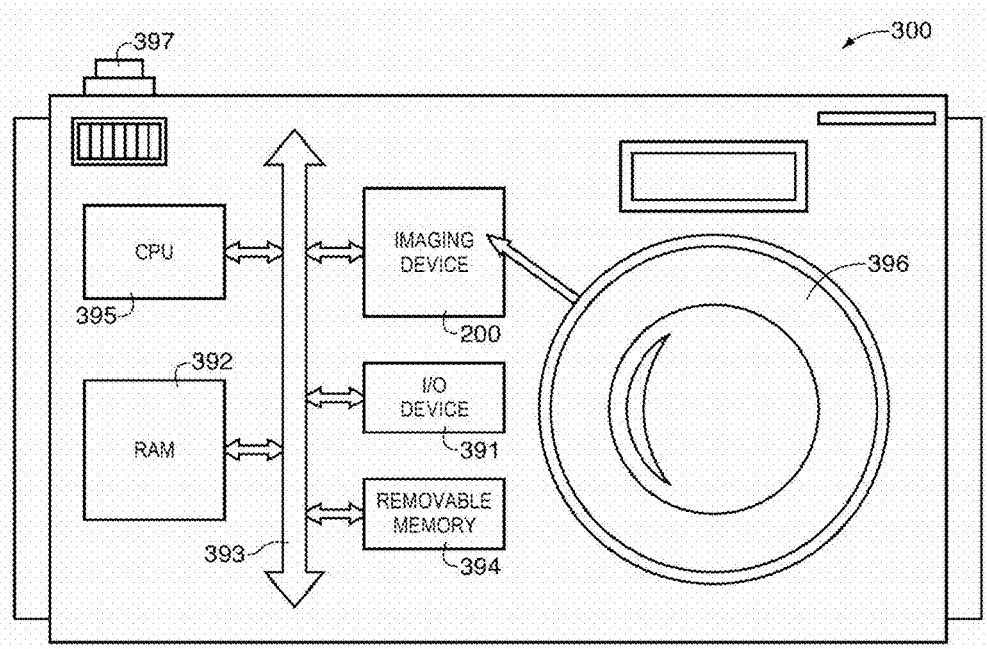
FIG. 8 is a block diagram of an imager employing the embodiments of FIGS. 1-7 in accordance with an embodiment of the present invention.

FIG. 8 shows, in simplified form, a typical processor system 300, such as device 10 of FIG. 1. Processor system 300 is exemplary of a system having digital circuits that could include imaging device 200 (e.g., an imaging system such as system image sensor 16 of FIG. 1). Without being limiting, such a system could include a computer system, still or video camera system, scanner, machine vision, vehicle navigation, video phone, surveillance system, auto focus system, star tracker system, motion detection system, image stabilization system, video gaming system, video overlay system, and other systems employing an imaging device.

Processor system 300, which may be a digital still or video camera system, may include a lens such as lens 396 for focusing an image onto a pixel array such as pixel array 201 when shutter release button 397 is pressed. Processor system 300 may include a central processing unit such as central processing unit (CPU) 395. CPU 395 may be a microprocessor that controls camera functions and one or more image flow functions and communicates with one or more input/output (I/O) devices 391 over a bus such as bus 393. Imaging device 200 may also communicate with CPU 395 over bus 393. System 300 may include random access memory (RAM) 392 and removable memory 394. Removable memory 394 may include flash memory that communicates with CPU 395 over bus 393. Imaging device 200 may be combined with CPU 395, with or without memory storage, on a single integrated circuit or on a different chip. Although bus 393 is illustrated as a single bus, it may be one or more buses or bridges or other communication paths used to interconnect the system components.

Various embodiments have been described illustrating electronic devices with image sensors having one or more image pixel arrays each with image pixels arranged in pixel rows and pixel columns. Each pixel column of an image pixel array may be coupled to column readout circuitry and column power control circuitry on an associated conductive column line. The column readout circuitry coupled to each pixel column over the corresponding column line may include signal processing circuitry. The column power control circuitry may include circuitry for selectively enabling and/or disabling the signal processing circuitry on selected column lines. The enabled column lines may be column lines for which column addresses have been received by the column power control circuitry and the column readout circuitry from additional control circuitry.

In a first mode of operation for the electronic device, substantially all of the image pixels in the image pixel array may be used to capture image data. In other modes of operation, only a portion of the image pixels in the image pixel array may be used to capture image data. In modes of operation in which only a portion of the image pixels in the image pixel array are to used to capture image data, column readout circuitry on column lines that are coupled to unused pixel columns may be disabled.

The column power control circuitry may include an OR gate having an input that receives column addresses and an output terminal that is coupled to an input set terminal of an SR latch. The SR latch may have an additional input reset terminal configured to receive a reset signal for resetting column power control. The SR latch may have an output terminal that is coupled to an input terminal of a flip-flop having an input clock terminal that receives a column power control update signal that prevents updates to the column power control during selected portions of pixel readout and signal processing operations.

The flip-flop may have an output terminal coupled to an input terminal of an NOR gate that has an additional input terminal that receives an always-on signal. The NOR gate may have an output terminal configured to power off even column readout circuits when the output signal from the NOR gate is a power off signal. The output terminal of the NOR gate may also be coupled to an input gate of an additional OR gate that includes an additional input terminal configured to receive an additional power off signal such as a skip2 signal (e.g., a signal configured to cause column power control circuitry 52 to power off and power on respective alternating pairs of pixel column circuitry), or other signals for causing the column power control circuitry to selectively power on or power off selected column readout circuits for various modes of operation of the image sensor.

The foregoing is merely illustrative of the principles of this invention which can be practiced in other embodiments.

What is claimed is:

1. An image sensor, comprising:
an array of image pixels arranged in pixel rows and pixel columns;
a plurality of column lines, wherein each one of the plurality of column lines is coupled to a corresponding pixel column;
column readout circuitry including analog-to-digital conversion circuitry and memory, wherein each one of the plurality of column lines is coupled to the column readout circuitry; and
column power control circuitry having at least one flip-flop with an input terminal configured to receive a power update clock signal, wherein the column power control circuitry is configured to selectively power on and power off the analog-to-digital conversion circuitry and the memory based on received column addresses and wherein the received column addresses indicate which portions of the analog-to-digital conversion circuitry and the memory are powered on and which portions of the analog-to-digital conversion circuitry and the memory are powered off.

2. The image sensor defined in claim 1 wherein the column power control circuitry further comprises a set-reset latch coupled to the at least one flip-flop.

3. The image sensor defined in claim 2 wherein the column power control circuitry further comprises an OR gate coupled to the set-reset latch.

4. The image sensor defined in claim 3 wherein the OR gate is coupled to a set input of the set-reset latch.

5. The image sensor defined in claim 4 wherein the column power control circuitry further comprises an NOR gate coupled to the at least one flip-flop.

6. The image sensor defined in claim 5 wherein the column control circuitry further comprises an additional OR gate coupled to the NOR gate.

7. The image sensor defined in claim 6 wherein the flip-flop comprises an output terminal and wherein the output terminal of the flip-flop is connected to an input terminal of the NOR gate.

8. The image sensor defined in claim 7 wherein the NOR gate comprises an output terminal and wherein the output terminal of the NOR gate is connected to an input terminal of the additional OR gate.

9. The image sensor defined in claim 8 wherein the column readout circuitry comprises:
multiplexing circuitry.

10. The image sensor defined in claim 1, wherein the column power control circuitry is configured to alternately power on and power off alternating columns of the analog-to-digital conversion circuitry and the memory in a horizontal skip mode.

11. An image sensor, comprising:
an array of image pixels arranged in pixel rows and pixel columns;
a plurality of column lines, wherein each one of the plurality of column lines is coupled to a corresponding pixel column;
column readout circuitry, wherein each one of the plurality of column lines is coupled to the column readout circuitry; and
column power control circuitry having a flip-flop, a latch coupled to an input terminal of the flip-flop, an OR gate coupled to the latch, a NOR gate coupled to an output terminal of the flip-flop, and an additional OR gate that receives an output from the NOR gate and a horizontal skip mode signal, wherein the column power control circuitry is configured to alternately power on and power off alternating columns of the column readout circuitry in a horizontal skip mode when the horizontal skip mode signal is asserted.

12. The image sensor defined in claim 11, further comprising:
additional column circuitry, wherein the column power control circuitry is configured to receive column addresses from the additional column circuitry.

13. The image sensor defined in claim 12 wherein the column readout circuitry comprises analog-to-digital conversion circuitry coupled to each of the plurality of column lines.

14. The image sensor defined in claim 13 wherein the column readout circuitry further comprises amplifiers coupled to each of the plurality of column lines.

15. The image sensor defined in claim 14 wherein the column readout circuitry further comprises memory for storing pixel signals from the array of image pixels.

16. The image sensor defined in claim 15 wherein the column readout circuitry further comprises multiplexing and demultiplexing circuitry coupled to the plurality of column lines.

17. The image sensor defined in claim 16, further comprising row control circuitry configured to provide row control signals to the pixel rows.

18. A system, comprising:
a central processing unit;
input-output circuitry; and
an imaging device, wherein the imaging device comprises:
an array of image pixels arranged in pixel rows and pixel columns;

a plurality of column lines, wherein each one of the plurality of column lines is coupled to a corresponding pixel column;

column readout circuitry including analog-to-digital conversion circuitry and memory, wherein each one of the plurality of column lines is coupled to the column readout circuitry;

column power control circuitry having at least one flip-flop with an input terminal configured to receive a power update clock signal, wherein the column power control circuitry is configured to selectively power-on and power-off the column readout circuitry based on column addresses and wherein the column addresses indicate which portions of the analog-to-digital conversion circuitry and the memory are powered on and which portions of the analog-to-digital conversion circuitry and the memory are powered off; and processing circuitry, wherein the column power control circuitry receives the column addresses from the processing circuitry.

19. The system defined in claim 18 wherein the column power control circuitry further comprises a latch and an OR gate coupled to an additional input terminal of the at least one flip-flop and a NOR gate and an additional OR gate coupled to an output terminal of the at least one flip-flop.

* * * * *